United States Patent
Liu et al.

(10) Patent No.: US 12,532,358 B2
(45) Date of Patent: Jan. 20, 2026

(54) CHANNEL ACCESS METHOD AND APPARATUS

(71) Applicant: HUAWEI TECHNOLOGIES CO., LTD., Guangdong (CN)

(72) Inventors: Peng Liu, Shenzhen (CN); Ziyang Guo, Shenzhen (CN); Yuchen Guo, Shenzhen (CN); Jiajun Luo, Shenzhen (CN); Xun Yang, Shenzhen (CN)

(73) Assignee: Huawei Technologies Co., LTD., Shenzhen (CN)

( * ) Notice: Subject to any disclaimer, the term of this patent is extended or adjusted under 35 U.S.C. 154(b) by 336 days.

(21) Appl. No.: 18/342,468

(22) Filed: Jun. 27, 2023

(65) Prior Publication Data

US 2023/0345536 A1    Oct. 26, 2023

Related U.S. Application Data

(63) Continuation of application No. PCT/CN2021/122982, filed on Oct. 11, 2021.

(30) Foreign Application Priority Data

Dec. 29, 2020 (CN) .......................... 202011603244.0

(51) Int. Cl.
*H04W 74/0816* (2024.01)
*H04W 24/02* (2009.01)
*H04W 72/1263* (2023.01)

(52) U.S. Cl.
CPC ....... *H04W 74/0816* (2013.01); *H04W 24/02* (2013.01); *H04W 72/1263* (2013.01)

(58) Field of Classification Search
CPC ............. H04W 74/0816; H04W 24/02; H04W 72/1263; H04W 74/08; H04W 74/002; G06N 3/092; G06N 3/08
See application file for complete search history.

(56) References Cited

U.S. PATENT DOCUMENTS

2019/0253226 A1    8/2019  Liu et al.
2020/0092176 A1*   3/2020  Huberman ............ H04L 41/147

FOREIGN PATENT DOCUMENTS

CN        109245840 A        1/2019
WO    WO-2020125716 A1 *    6/2020    ......... H04L 41/0823

OTHER PUBLICATIONS

Yu et al., "Deep-Reinforcement Learning Multiple Access for Heterogeneous Wireless Networks," Proceedings of 2018 IEEE International Conference on Communications (ICC), May 20-24, 2018, 7 pages.

(Continued)

*Primary Examiner* — Chae S Lee
(74) *Attorney, Agent, or Firm* — Fish & Richardson P.C.

(57) ABSTRACT

The present disclosure relates to a channel access method and a channel access apparatus. In an example method, a first node obtains network status information in a target period. The network status information includes a first time segment and a second time segment. The first node inputs the network status information into a target neural network, to obtain a first prediction value and a second prediction value. The first node sends a to-be-sent packet to a second node through the shared channel in response to determining that the first prediction value is greater than the second prediction value.

20 Claims, 7 Drawing Sheets

---

S101: A first node obtains network status information at each moment in a target period, where the target period is a time segment of preset duration that includes a first moment and that is before the first moment, and the network status information includes a first time segment and a second time segment S102: The first node inputs the network status information at each moment into a target neural network, to obtain a prediction result, where the prediction result includes a first prediction value and a second prediction value S103: The first node sends a to-be-sent packet to a second node through a to-be-accessed channel when the first prediction value is greater than the second prediction value

(56) References Cited

OTHER PUBLICATIONS

Yu et al., "Carrier-Sense Multiple Access for Heterogeneous Wireless Networks Using Deep Reinforcement Learning," Proceedings of 2019 IEEE Wireless Communications and Networking Conference Workshop (WCNCW), Apr. 15-18, 2019, 7 pages.
Yu et al., "Non-Uniform Time-Step Deep Q-Network for Carrier-Sense Multiple Access in Heterogeneous Wireless Networks," IEEE Transactions on Mobile Computing, Apr. 27, 2020, 14 pages.
Extended European Search Report in European Appln No. 21913318.8, dated Jun. 20, 2024, 29 pages.

\* cited by examiner

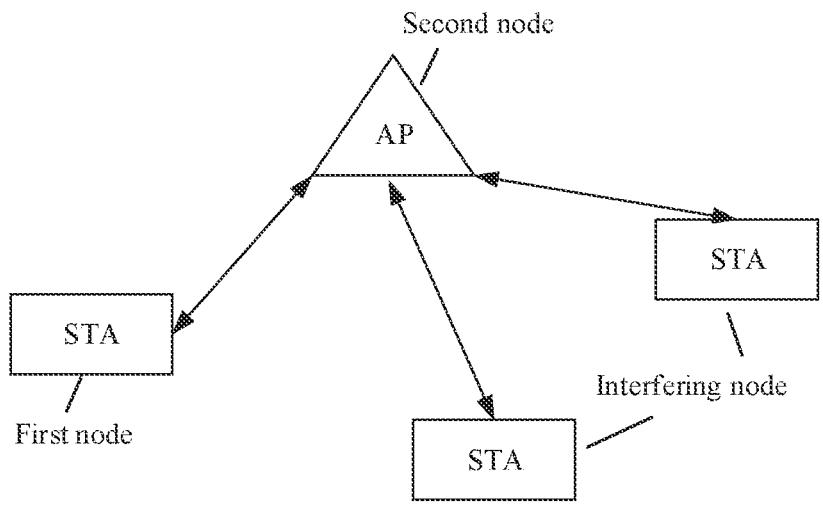

FIG. 3

A first node obtains network status information at each moment in a target period, where the target period is a time segment of preset duration that includes a first moment and that is before the first moment, and the network status information includes a first time segment and a second time segment — S101

The first node inputs the network status information at each moment into a target neural network, to obtain a prediction result, where the prediction result includes a first prediction value and a second prediction value — S102

The first node sends a to-be-sent packet to a second node through a to-be-accessed channel when the first prediction value is greater than the second prediction value — S103

FIG. 4

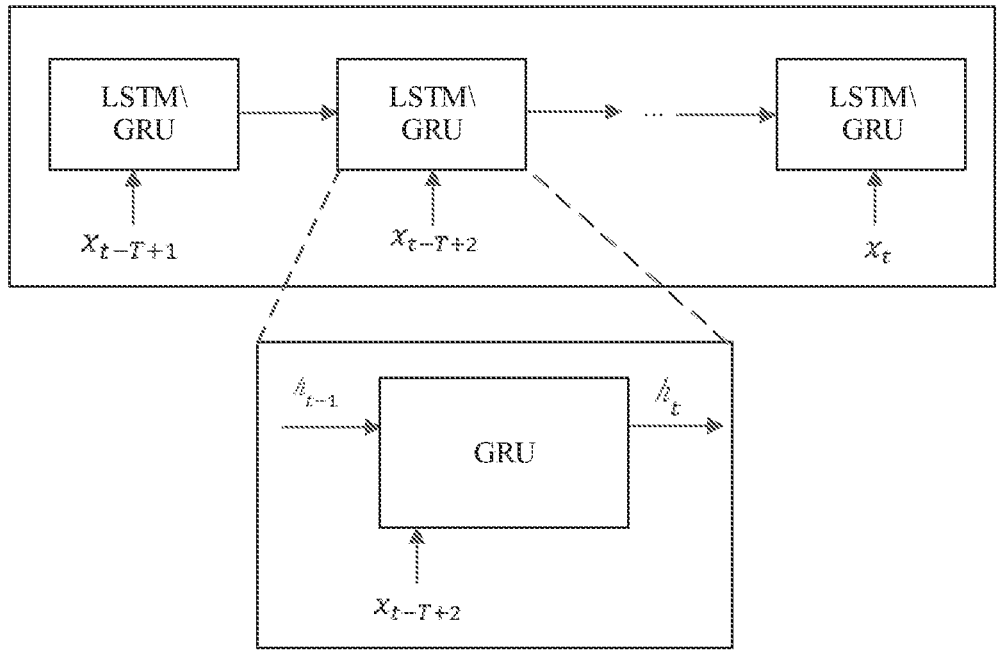

FIG. 7

A first node obtains network status information at each moment in a target period, where the target period is a time segment of preset duration that includes a first moment and that is before the first moment, and the network status information includes a busy/idle state of a to-be-accessed channel detected by the first node, a first time segment, a second time segment, and a number of interfering nodes — S201

The first node inputs the network status information at each moment into a target neural network, to obtain a prediction result, where the prediction result includes a first prediction value and a second prediction value — S202

The first node sends a to-be-sent packet to a second node through a to-be-accessed channel when the first prediction value is greater than the second prediction value — S203

FIG. 8

CHANNEL ACCESS METHOD AND APPARATUS

CROSS-REFERENCE TO RELATED APPLICATIONS

This application is a continuation of International Application No. PCT/CN2021/122982, filed on Oct. 11, 2021, which claims priority to Chinese Patent Application No. 202011603244.0, filed on Dec. 29, 2020. The disclosures of the aforementioned applications are hereby incorporated by reference in their entireties.

TECHNICAL FIELD

This solution relates to the communication field, and in particular, to a channel access method and apparatus.

BACKGROUND

On a wireless network such as a short-range transmission network system and a wireless fidelity (wireless fidelity, WIFI) system, a channel is shared, in other words, a plurality of nodes on the wireless network use a same shared channel for communication.

On the network, if two or more nodes simultaneously send a packet, a communication collision occurs, and the nodes fails to transmit the packet. Consequently, a throughput of the channel is reduced, and a node communication delay on the network is increased, which greatly affects user experience. It can be learned that a node channel access decision is important in communication and decisive in user experience.

In a distributed scenario, no central node performs unified scheduling and coordination on all nodes on a network, and a node directly decides whether to access a shared channel. Currently, the node can randomly access the shared channel or obtain a large amount of data to predict a result of accessing the shared channel and decide whether to access the channel. In this method, a probability of successfully accessing the channel is low, and a channel throughput is low.

SUMMARY

Embodiments of this application provide a channel access method and apparatus. In the method, before sending a packet to a second node through a shared channel, a first node may input obtained network status information at each moment in a target period into a target neural network, to obtain a prediction result of sending the packet to the second node at a first moment, and finally determine, based on the prediction result, whether to send the packet to the second node through the shared channel.

The target period is a time segment of preset duration that includes the first moment and that is before the first moment. The network status information may include a first time segment, a second time segment, a busy/idle state of a shared channel detected by the first node, and a number of interfering nodes. A first time segment corresponding to a second moment indicates a time interval between the second moment and a time point at which the first node successfully sends a packet last time through the shared channel before the second moment, and a second time segment corresponding to the second moment indicates a time interval between the second moment and a time point at which an interfering node successfully sends a packet last time through the shared channel before the second moment. The interfering node is a node that is detected by the second node and that sends a packet through the shared channel other than the first node. The second moment is any moment in the target period.

According to this technical solution, a node can decide, based on a current network status in a past period of time, whether to access a shared channel. This method can improve a success rate of accessing the channel by the node, and increase a throughput of the channel.

According to a first aspect, an embodiment of this application provides a channel access method. The method includes:

A first node obtains network status information at each moment in a target period, where the target period is a time segment of preset duration that includes a first moment and that is before the first moment; the network status information includes a first time segment and a second time segment, a first time segment corresponding to a second moment indicates a time interval between the second moment and a time point at which the first node successfully sends a packet last time through a shared channel before the second moment, and a second time segment corresponding to the second moment indicates a time interval between the second moment and a time point at which an interfering node successfully sends a packet last time through the shared channel before the second moment; the interfering node is a node that is detected by a second node and that sends a packet through the shared channel other than the first node; and the second moment is any moment in the target period;

the first node inputs the network status information at each moment into a target neural network, to obtain a prediction result, where the prediction result includes a first prediction value and a second prediction value, the first prediction value indicates a probability that the first node successfully sends a packet to the second node at the first moment through the shared channel, and the second prediction value indicates a probability that the first node fails to send the packet to the second node at the first moment through the shared channel; and the first node sends a to-be-sent packet to the second node through the shared channel when the first prediction value is greater than the second prediction value.

With reference to the first aspect, in a possible implementation, the network status information further includes a busy/idle state of the shared channel detected by the first node and a number of interfering nodes.

With reference to the first aspect, in a possible implementation, that a first node obtains network status information at each moment in a target period includes: obtaining the second time segment corresponding to the second moment; and the obtaining the second time segment corresponding to the second moment includes:

determining, by the first node when detecting response information at the second moment based on first indication information, that the second time segment corresponding to the second moment is 0, where the second moment is a moment after first duration of detecting a first packet by the first node, a header of the first packet includes the first indication information, and the first indication information indicates a node receiving the first packet to send the response information after the first duration.

With reference to the first aspect, in a possible implementation, that a first node obtains network status information at each moment in a target period includes: obtaining the second time segment corresponding to the second moment; and the obtaining the second time segment corresponding to the second moment includes:

determining, by the first node when detecting response information including second indication information at the second moment, that the second time segment corresponding to the second moment is 0, where the second indication information indicates that a sending result of a packet corresponding to the response information including the second indication information indicates a success; or determining, by the first node when detecting response information including third indication information at the second moment, that the second time segment corresponding to the second moment is a sum of a first time interval and a second time segment corresponding to a moment previous to the second moment in the target period, where the first time interval is a time interval between the previous moment and the second moment, and the third indication information indicates that a sending result of a packet corresponding to the response information including the second indication information indicates a failure.

With reference to the first aspect, in a possible implementation, that a first node obtains network status information at each moment in a target period includes: obtaining a number of interfering nodes at the second moment; and the obtaining a number of interfering nodes at the second moment includes:

receiving, by the first node at the second moment, a first broadcast frame broadcast by the second node; and determining, by the first node, a number of interfering nodes parsed from the first broadcast frame as the number of interfering nodes at the second moment.

With reference to the first aspect, in a possible implementation, that a first node obtains network status information at each moment in a target period includes: obtaining the second time segment corresponding to the second moment; and the obtaining the second time segment corresponding to the second moment includes:

determining, by the first node when receiving a second broadcast frame at the second moment, that the second time segment corresponding to the second moment is 0, where the second broadcast frame is broadcast by the second node to the first node when the second node detects that the interfering node successfully sends the packet through the shared channel.

With reference to the first aspect, in a possible implementation, the second broadcast frame includes a first time point, and the first time point is a moment at which the second node detects that the interfering node successfully sends the packet through the shared channel.

With reference to the first aspect, in a possible implementation, that the first node determines, when receiving a second broadcast frame at the second moment, that the second time segment corresponding to the second moment is 0 includes:

The first node determines a time interval between the first time point and the second moment as a first time interval;

the first node determines a time interval between the second moment and a moment at which a previous second time segment corresponding to the second moment is 0 as a second time interval; and when the first time interval is shorter than the second time interval, the first node determines that the second time segment corresponding to the second moment is 0.

With reference to the first aspect, in a possible implementation, after the first node sends a to-be-sent packet to the second node through the shared channel, the method further includes:

The first node obtains a sending result of the to-be-sent packet; and the first node updates the target neural network by using the network status information at each moment in the target period as an input and the sending result of the to-be-sent packet as a label.

With reference to the first aspect, in a possible implementation, that the first node updates the target neural network by using the network status information in the target period as an input and the sending result of the to-be-sent packet as a label includes:

updating the target neural network based on a loss, where the loss includes an error between the prediction result and the sending result of the to-be-sent packet.

With reference to the first aspect, in a possible implementation, the loss further includes a reward value at the first moment, and the reward value is determined based on the prediction result and a busy/idle state of the shared channel detected by the first node at the first moment.

With reference to the first aspect, in a possible implementation, when the sending result of the to-be-sent packet indicates a success, that the reward value is a ratio of the first time segment to the second time segment is determined; or when the sending result of the to-be-sent packet indicates a failure, that the reward value is a negative value of a number of interfering nodes at the first moment is determined.

With reference to the first aspect, in a possible implementation, the first node monitors the shared channel at the first moment when the first prediction value is less than the second prediction value; and when detecting, at the first moment, that there is response information indicating that a packet is successfully sent on the shared channel, the first node determines that a reward value is a ratio of a second time segment corresponding to the first moment to a first time segment corresponding to the first moment; or when detecting, at the first moment, that there is response information indicating that the packet fails to be sent on the shared channel, the first node determines that the reward value is M, where M is a positive integer; or the first node determines, when detecting that there is no response information on the shared channel at the first moment, that the reward value is 0.

According to a second aspect, a channel access apparatus is disclosed. The apparatus includes:

an obtaining unit, configured to obtain network status information at each moment in a target period, where the target period is a time segment of preset duration that includes a first moment and that is before the first moment; the network status information includes a first time segment and a second time segment, a first time segment corresponding to a second moment indicates a time interval between the second moment and a time point at which a first node successfully sends a packet last time through a shared channel before the second moment, and a second time segment corresponding to the second moment indicates a time interval between the second moment and a time point at which an interfering node successfully sends a packet last time through the shared channel before the second moment; the interfering node is a node that is detected by a second node and that sends a packet through the shared channel other than the first node; and the second moment is any moment in the target period;

a prediction unit, configured to input the network status information at each moment into a target neural network, to obtain a prediction result, where the prediction result includes a first prediction value and a second prediction value, the first prediction value indicates a probability that the first node successfully sends a packet to the second node at the first moment through the shared channel, and the second prediction value indicates a probability that the first node fails to send the packet to the second node at the first moment through the shared channel; and a decision making unit, configured to send a to-be-sent packet to the second node through the shared channel when the first prediction value is greater than the second prediction value.

In a possible implementation, the obtaining unit is further configured to obtain a busy/idle state of the shared channel detected by the first node and a number of interfering nodes.

In a possible implementation, the obtaining unit is specifically configured to obtain the second time segment corresponding to the second moment.

The first node determines, when detecting response information at the second moment based on first indication information, that the second time segment corresponding to the second moment is 0, where the second moment is a moment after first duration of detecting a first packet by the first node, a header of the first packet includes the first indication information, and the first indication information indicates a node receiving the first packet to send the response information after the first duration.

In a possible implementation, the obtaining unit is specifically configured to obtain the second time segment corresponding to the second moment.

The first node determines, when detecting response information including second indication information at the second moment, that the second time segment corresponding to the second moment is 0, where the second indication information indicates that a sending result of a packet corresponding to the response information including the second indication information indicates a success.

Alternatively, the first node determines, when detecting response information including third indication information at the second moment, that the second time segment corresponding to the second moment is a sum of a first time interval and a second time segment corresponding to a moment previous to the second moment in the target period, where the first time interval is a time interval between the previous moment and the second moment, and the third indication information indicates that a sending result of a packet corresponding to the response information including the second indication information indicates a failure.

In a possible implementation, the obtaining unit is specifically configured to obtain a number of interfering nodes at the second moment.

The first node receives, at the second moment, a first broadcast frame broadcast by the second node.

The first node determines a number of interfering nodes parsed from the first broadcast frame as the number of interfering nodes at the second moment.

In a possible implementation, the obtaining unit is specifically configured to obtain the second time segment corresponding to the second moment.

The first node determines, when receiving a second broadcast frame at the second moment, that the second time segment corresponding to the second moment is 0, where the second broadcast frame is broadcast by the second node to the first node when the second node detects that the interfering node successfully sends the packet through the shared channel.

In a possible implementation, the second broadcast frame includes a first time point, and the first time point is a moment at which the second node detects that the interfering node successfully sends the packet through the shared channel.

In a possible implementation, the obtaining unit is specifically configured to:

determine a time interval between the first time point and the second moment as a first time interval;

determine a time interval between the second moment and a moment at which a previous second time segment corresponding to the second moment is 0 as a second time interval; and when the first time interval is shorter than the second time interval, determine that the second time segment corresponding to the second moment is 0.

In a possible implementation, the channel access apparatus further includes a training unit, and the training unit is configured to:

obtain a sending result of the to-be-sent packet; and update the target neural network by using the network status information at each moment in the target period as an input and the sending result of the to-be-sent packet as a label.

In a possible implementation, the channel access apparatus further includes the training unit, and the training unit is specifically configured to update the target neural network based on a loss, where the loss includes an error between the prediction result and the sending result of the to-be-sent packet.

In a possible implementation, the loss further includes a reward value at the first moment, and the reward value is determined based on the prediction result and a busy/idle state of the shared channel detected by the first node at the first moment.

In a possible implementation, the channel access apparatus further includes the training unit, and the training unit is further configured to:

when the sending result of the to-be-sent packet indicates a success, determine that the reward value is a ratio of the first time segment to the second time segment; or when the sending result of the to-be-sent packet indicates a failure, determine that the reward value is a negative value of a number of interfering nodes at the first moment.

In a possible implementation, the channel access apparatus further includes the training unit, and the training unit is further configured to:

monitor the shared channel at the first moment when the first prediction value is less than the second prediction value; and when detecting, at the first moment, that there is response information indicating that a packet is successfully sent on the shared channel, determine that a reward value is a ratio of a second time segment corresponding to the first moment to a first time segment corresponding to the first moment; or when detecting, at the first moment, that there is response information indicating that the packet fails to be sent on the shared channel, determine that the reward value is M, where M is a positive integer; or determine, when detecting that there is no response information on the shared channel at the first moment, that the reward value is 0.

According to a third aspect, a channel access apparatus is disclosed. The channel access apparatus may include a processor, a memory, an input interface, and an output interface. The input interface is configured to receive information from another channel access apparatus other than the channel access apparatus. The output interface is configured to output information to the another channel access apparatus other than the channel access apparatus. When the processor executes a computer program stored in the memory, the processor is enabled to perform the channel access method disclosed in any one of the first aspect or the implementations of the first aspect.

According to a fourth aspect, a channel access network is disclosed. The channel access network includes the channel access apparatus according to the second aspect and the channel access apparatus according to the third aspect.

According to a fifth aspect, a computer-readable storage medium is disclosed. The computer-readable storage medium stores a computer program or computer instructions. When the computer program or the computer instructions are run, the channel access method disclosed in the aspects is implemented.

BRIEF DESCRIPTION OF DRAWINGS

The following describes the accompanying drawings used in embodiments of this application.

FIG. 3 is a schematic diagram of another channel access network architecture according to an embodiment of this application;

FIG. 4 is a flowchart of a channel access method according to an embodiment of this application;

FIG. 7 is a schematic diagram of a target neural network according to an embodiment of this application;

FIG. 8 is a flowchart of another channel access method according to an embodiment of this application;

DESCRIPTION OF EMBODIMENTS

Figure 1:
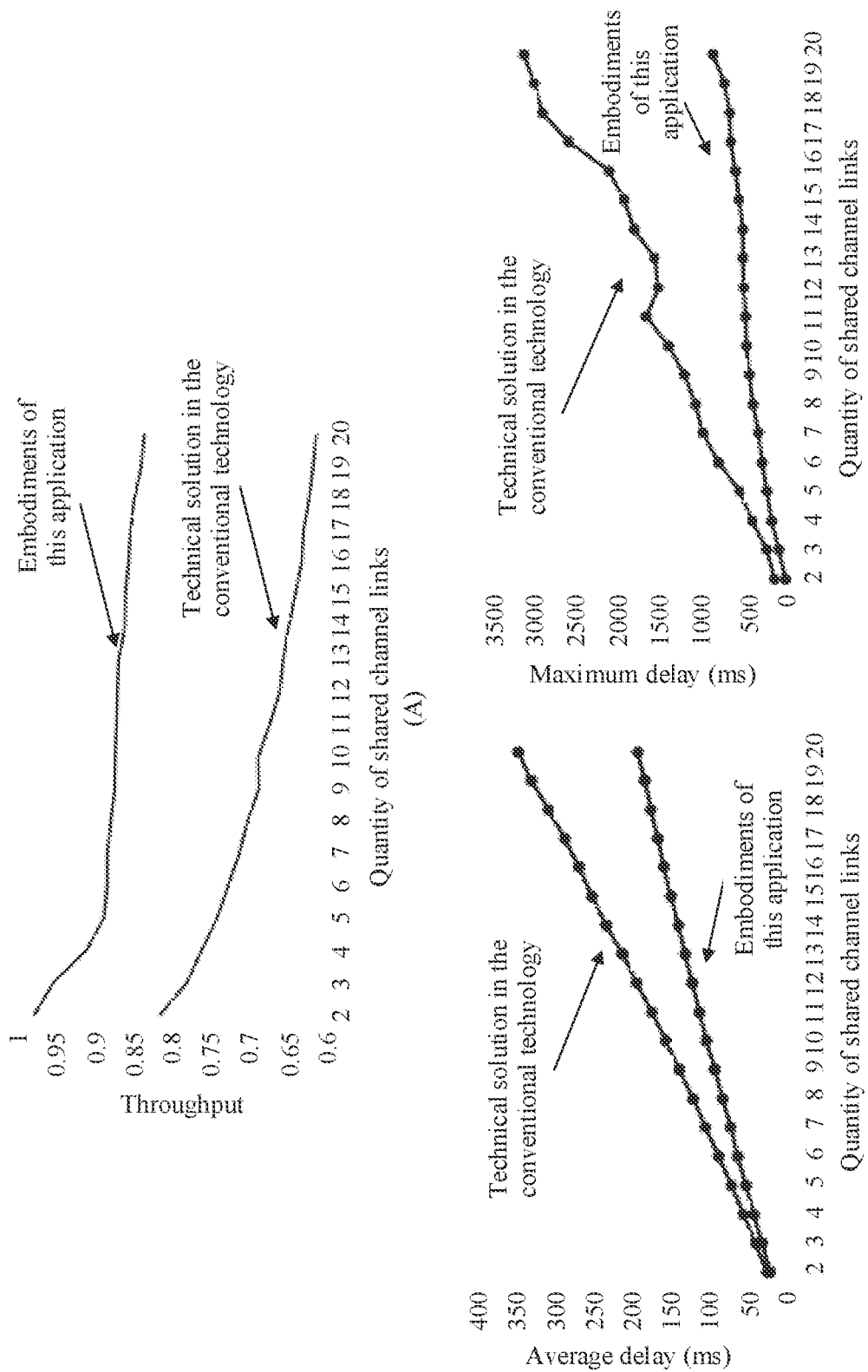
FIG. 1 is a schematic diagram of effect comparison according to an embodiment of this application.

Terms used in the following embodiments of this application are merely intended to describe specific embodiments, and are not intended to limit embodiments of this application. The terms "one", "a", "the", "the foregoing", "this", and "the one" of singular forms used in this specification and the appended claims of embodiments of this application are also intended to plural forms, unless otherwise specified in the context clearly. It should be further understood that the term "and/or" used in embodiments of this application indicates and includes any or all possible combinations of one or more listed items.

In embodiments of this application, a first node is a node that sends a packet to a second node, and the second node is a node that receives the packet from the first node. Because the first node, the second node, and an interfering node all perform communication through a shared channel, if the interfering node sends a packet through the shared channel when the first node accesses the shared channel, that the first node sends the packet to the second node is affected. Therefore, before the first node sends the packet to the second node, the first node can perform a channel access method provided in embodiments of this application, to determine whether to access the shared channel.

An embodiment of this application provides a channel access method and apparatus. In the method, before sending a packet to a second node through a shared channel, a first node may input obtained network status information at each moment in a target period into a target neural network, to obtain a prediction result of sending the packet to the second node at a first moment, and finally determine, based on the prediction result, whether to send the packet to the second node through the shared channel.

The target period is a time segment of preset duration that includes the first moment and that is before the first moment. The network status information may include a first time segment, a second time segment, a busy/idle state of a shared channel detected by the first node, and a number of interfering nodes. A first time segment corresponding to a second moment indicates a time interval between the second moment and a time point at which the first node successfully sends a packet last time through the shared channel before the second moment, and a second time segment corresponding to the second moment indicates a time interval between the second moment and a time point at which an interfering node successfully sends a packet last time through the shared channel before the second moment. The interfering node is a node that is detected by the second node and that sends a packet through the shared channel other than the first node. The second moment is any moment in the target period.

According to this technical solution, a node can decide, based on a current network status, whether to access a shared channel. This method can improve a success rate of accessing the channel by the node, and increase a throughput of the channel.

Specifically, FIG. 1 is a schematic diagram of effect comparison according to this embodiment of this application. As shown in (A) in FIG. 1, this technical solution increases a throughput of a channel. As shown in (B) in FIG. 1, this technical solution reduces average delay and maximum delay of communication between nodes.

To better understand a channel access method and apparatus provided in embodiments of this application, the following first describes a network architecture used in embodiments of this application.

Figure 2:
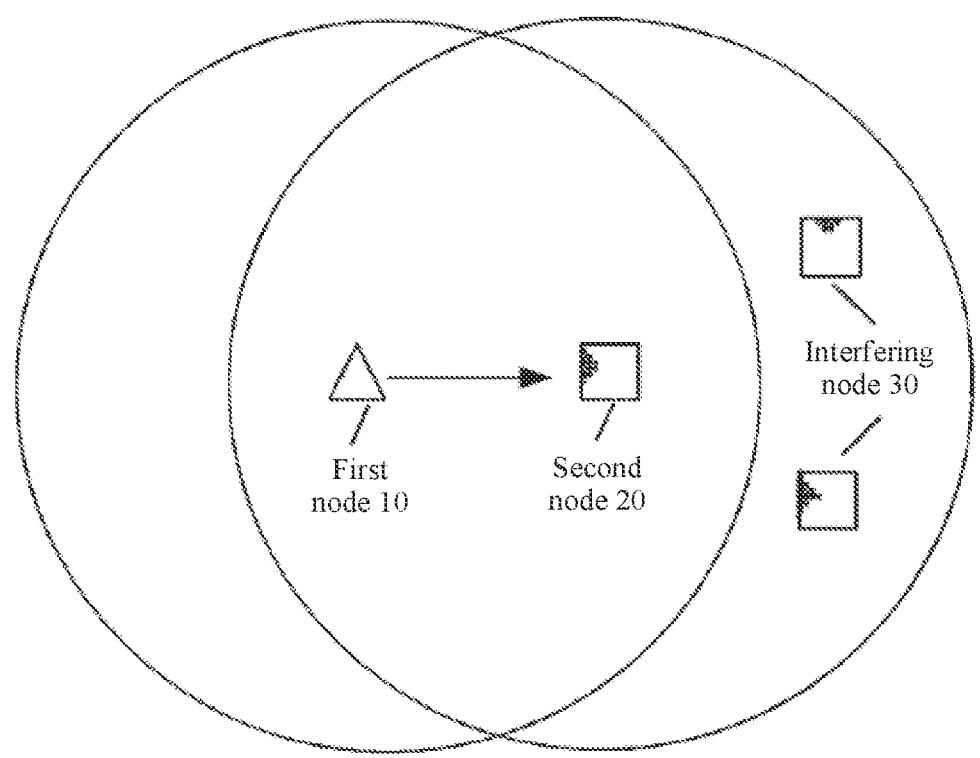
FIG. 2 is a schematic diagram of a channel access network architecture according to an embodiment of this application.

FIG. 2 is a schematic diagram of a channel access network architecture according to an embodiment of this application. As shown in FIG. 2, the network architecture includes a first node 10, a second node 20, and an interfering node 30. There may be a plurality of interfering nodes 30, and the first node 10, the second node 20, and the interfering node 30 all perform communication through a same shared channel.

Specifically, before sending a packet to the second node 20 through the shared channel, the first node 10 may input obtained network status information at each moment in a target period into a target neural network, to obtain a prediction result of sending the packet to the second node 20 at a first moment. Finally, the first node 10 determines, based on the prediction result, whether to send the packet to the second node 20 through the shared channel.

The first node 10 may obtain the network status information at each moment in the target period, where the target period is a time segment of preset duration that includes the first moment and that is before the first moment. The network status information may include a busy/idle state of the shared channel detected by the first node 10, a first time segment, a second time segment, and a number of interfering nodes. A first time segment corresponding to a second moment indicates a time interval between the second moment and a time point at which the first node 10 successfully sends a packet last time through the shared channel before the second moment, a second time segment corresponding to the second moment indicates a time interval between the second moment and a time point at which the interfering node 30 successfully sends a packet last time through the shared channel before the second moment, and the second moment is any moment in the target period. The interfering node 30 is a node that is detected by the second node 20 and that sends a packet through the shared channel other than the first node 10. Further, the first node 10 inputs the network status information at each moment into the target neural network, to obtain the prediction result, where the prediction result includes a first prediction value and a second prediction value, the first prediction value indicates a probability that the first node 10 successfully sends a packet to the second node 20 at the first moment through the shared channel, and the second prediction value indicates a probability that the first node 10 fails to send the packet to the second node 20 at the first moment through the shared channel. The first node 10 sends a to-be-sent packet to the second node 20 through the shared channel when the first prediction value is greater than the second prediction value.

Any one of the first node 10, the second node 20, and the interfering node 30 in this embodiment of this application may be an access point AP or a station STA.

The station STA may be user equipment, an access terminal, a subscriber unit, a subscriber station, a mobile station, a mobile console, a remote station, a remote terminal, a mobile device, a user terminal, a terminal, a wireless communication device, a user agent, or a user apparatus. The station may alternatively be a cellular phone, a cordless phone, a session initiation protocol (session initiation protocol, SIP) phone, a wireless local loop (wireless local loop, WLL) station, a personal digital assistant (personal digital assistant, PDA), a handheld device having a wireless communication function, a computing device, another processing device connected to a wireless modem, a vehicle-mounted device, a wearable device, a terminal device in a future 5G network, a terminal device in a future evolved public land mobile network (public land mobile network, PLMN), or the like. This is not limited in embodiments of this application.

The access point AP may be a device configured to communicate with the station. The access point may be any device having a wireless transceiver function or a chip that can be disposed in the device. The device includes but is not limited to an evolved NodeB (evolved NodeB, eNB), a radio network controller (radio network controller, RNC), a NodeB (NodeB, NB), a base station controller (base station controller, BSC), a base transceiver station (base transceiver station, BTS), a home base station (for example, home evolved NodeB or a home Node B, HNB), a baseband unit (base band Unit, BBU), an access point (access point, AP) in a wireless fidelity (wireless fidelity, WIFI) system, a wireless relay node, a wireless backhaul node, a transmission point (transmission point, TP), a transmission and reception point (transmission and reception point, TRP), or the like. Alternatively, the device may be a gNB or a transmission point (TRP or TP) in a 5G system, for example, NR, one antenna panel or a group of antenna panels (including a plurality of antenna panels) of a base station in the 5G system, or a network node included in a gNB or a transmission point, such as a baseband unit (BBU) or a distributed unit (distributed unit, DU).

FIG. 3 is a schematic diagram of another channel access network architecture according to an embodiment of this application. As shown in FIG. 3, the channel access network architecture includes a first node, a second node, and an interfering node, where the second node is an AP, and both the first node and the interfering node are STAs connected to the second node. It may be understood that, the second node may obtain responses to packets sent by all STAs on a same network.

In an implementation, when obtaining the responses to the packets sent by all the STAs on the same network, the second node may generate a broadcast frame based on moments at which the responses are obtained, and broadcast the broadcast frame to all the STAs on the same network. It may be understood that, when performing the channel performing method in embodiments of this application, the STA receiving the broadcast frame may update a second time segment based on the broadcast frame. For detailed content, refer to related content of the channel access method in the following embodiments of this application.

It should be noted that the technical solutions of this application may be used in communication between APs, communication between an AP and a STA, or communication between STAs. Communication between an AP and a STA is used as an example for description below, and constitutes no limitation on embodiments of this application.

It may be understood that channel access network architectures in FIG. 2 and FIG. 3 are merely example implementations in embodiments of this application. A channel access network architecture in embodiments of this application includes but is not limited to the foregoing channel access network architectures.

FIG. 4 is a flowchart of a channel access method according to an embodiment of this application. The method is applied to the channel access network in FIG. 2 or FIG. 3, and the method may include some or all of the following steps.

S101: A first node obtains network status information at each moment in a target period, where the target period is a time segment of preset duration that includes a first moment and that is before the first moment, and the network status information includes a first time segment and a second time segment.

Specifically, the first node may obtain the network status information at each moment in the target period. The target period is the time segment of the preset duration that includes the first moment and that is before the first moment. The network status information may include the first time segment and the second time segment. A first time segment corresponding to a second moment indicates a time interval between the second moment and a time point at which the first node successfully sends a packet last time through a shared channel before the second moment, and a second time segment corresponding to the second moment indicates a time interval between the second moment and a time point at which an interfering node successfully sends a packet last time through the shared channel before the second moment. The interfering node is a node that is detected by a second node and that sends a packet through the shared channel other than the first node. The second moment is any moment in the target period.

Figure 5:
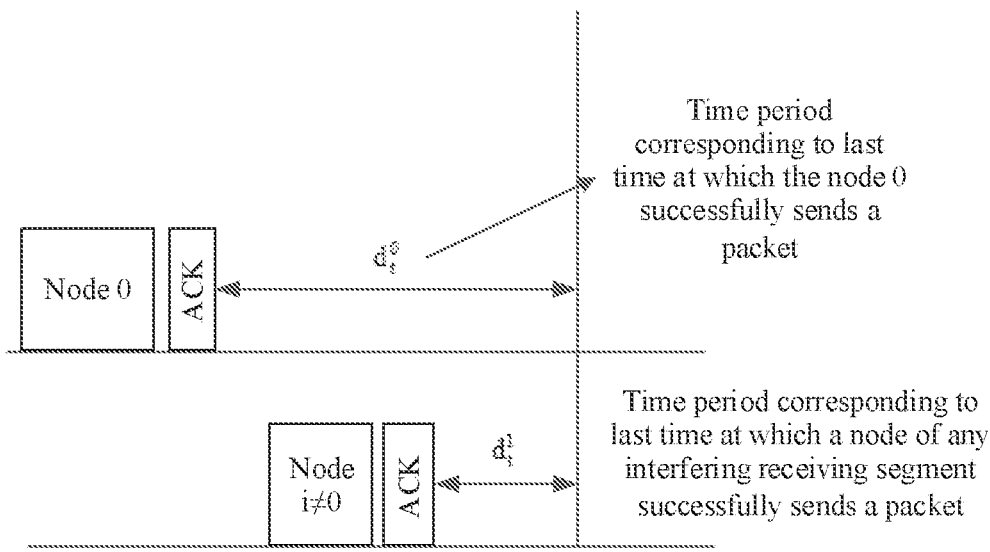
FIG. 5 is a schematic diagram of a first time segment and a second time segment according to an embodiment of this application.

FIG. 5 is a schematic diagram of the first time segment and the second time segment according to this embodiment of this application. A node 0 (node 0) indicates the first node in this embodiment of this application, a node i≠0 indicates the interfering node in this embodiment of this application, and response information (Acknowledge character, ACK) indicates a time point of response indicating that a node successfully sends a packet. As shown in FIG. 5, a time period ($d_t^0$) corresponding to last time at which the node 0 performs sending successfully is the first time segment in this embodiment of this application, and a time period ($d_t^1$) corresponding to last time at which a node of any interfering receiving segment performs sending successfully last time is the second time segment in this embodiment of this application.

Specifically, step S101 includes some or all of the following steps.

S1011: The first node obtains the first time segment corresponding to each moment in the target period.

Specifically, after sending a packet, the first node may receive a response to the packet, and may determine, based on the response, a first time segment corresponding to a moment at which the response is received.

When receiving the response indicating that the packet is successfully sent, the first node may determine that the first time segment corresponding to the moment at which the response is received is 0. When receiving the response indicating that the packet fails to be sent, the first node may determine that the first time segment corresponding to the moment at which the response is received is a time interval from a moment at which the first node performs clearing last time to the moment at which the response is received. For example, if the first node receives, at the first moment, the response indicating that the packet is successfully sent, the first time segment corresponding to the first moment is 0; or if the first node receives, at the first moment, the response indicating that the packet fails to be sent, and a time interval between the first moment and a last time point when the second time segment is 0 is t, the first node determines that the first time segment corresponding to the first moment is t.

It should be noted that a second time segment corresponding to a moment at which the first node does not send a packet is a time interval between the moment and a moment at which the first node successfully sends a packet before the moment.

S1012: The first node obtains the second time segment corresponding to each moment in the target period.

Specifically, the first node may monitor a packet sent by the interfering node, determine, based on the packet, a time point at which the interfering node successfully sends a packet last time, and obtain, based on the time point, a second time segment corresponding to a current moment.

In some embodiments, the first node may demodulate all received packets, and determine, based on an ID (MAC address) of the packet and a type of the packet, whether the packet is from the interfering node of the second node and whether the packet is the response information. The method is highly complex and has large power consumption.

The following describes three implementations of obtaining the second time segment corresponding to each moment in the target period provided in embodiments of this application. The implementations each are an immediate response method, and can reduce complexity and power consumption.

In an implementation, the data packet sent by the interfering node includes first indication information, and the first indication information indicates that a node receiving the data packet sends response information after first duration of receiving the data packet.

Specifically, at each moment in the target period, the first node may monitor a data packet in a first target range, where the first target range may be a maximum range in which the first node can detect the packet. When detecting the data packet including the first indication information, the first node may monitor whether there is response information after the first duration. When detecting the response information, the first node may determine that the data packet is successfully sent, and then determine that the second time segment corresponding to the current moment is 0.

Figure 6A:
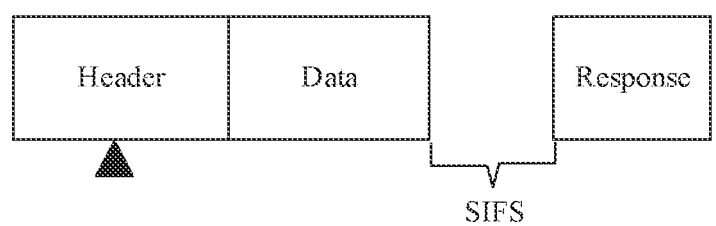
FIG. 6A is a schematic diagram of obtaining a second time segment according to an embodiment of this application.

FIG. 6A is a schematic diagram of obtaining the second time segment according to this embodiment of this application. The first indication information may be in a physical layer header of the packet, and the first node may monitor the response after a short interframe space (Short interframe space, SIFS). It may be understood that shorter first duration indicates shorter delay in updating the second time segment by the first node, and higher accuracy of the second time segment.

In another implementation, the first node may determine, based on indication information in a detected response packet, the second time segment corresponding to the moment of detecting the response packet. The indication information in the response packet may be indication information indicating that the packet corresponding to the response packet fails to be sent, or may be indication information indicating that the packet corresponding to the response packet is successfully sent.

Specifically, the first node determines, when detecting response information including second indication information at the second moment, that the second time segment corresponding to the second moment is 0, where the second indication information indicates that a sending result of a packet corresponding to the response information including the second indication information indicates a success; or the first node determines, when detecting response information including third indication information at the second moment, that the second time segment collected at the second moment is a sum of a first time interval and a second time segment corresponding to a previous collected moment corresponding to the second moment, where the first time interval is a time interval between the second moment and a previous moment corresponding to the second moment in the target period, and the third indication information indicates that a sending result of a packet corresponding to the response information including the second indication information indicates a failure.

Figure 6B:
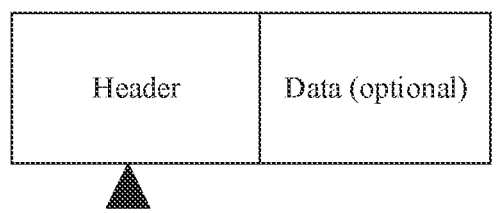
FIG. 6B is a schematic diagram of a response packet according to an embodiment of this application.

FIG. 6B is a schematic diagram of a response packet according to this embodiment of this application. As shown in FIG. 6B, indication information in the response packet may be a special bit, a phase, a field value, and the like that are carried in a header of the response packet, and the special bit, the phase, the field value, and the like that are carried in the header are used as a rule for distinguishing a sending structure of a packet corresponding to the response packet.

In still another implementation, the first node determines the second time segment corresponding to each moment based on a broadcast frame sent by the second node.

In some embodiments, the first node determines, when receiving a second broadcast frame at the second moment, that the second time segment corresponding to the second moment is 0, where the second broadcast frame is broadcast by the second node to the first node when the second node detects that the interfering node successfully sends the packet through the shared channel.

For example, in the network architecture shown in FIG. 3, the second node is an AP, and the other nodes are STAs. In this case, when obtaining a response indicating that the interfering node successfully sends the packet, the second node generates the second broadcast frame, and broadcasts the second broadcast frame to each STA on the network. It may be understood that each STA on the network may perform the channel access method provided in this embodiment of this application. Therefore, each STA may determine the second time segment corresponding to each moment based on the second broadcast frame broadcast by the second node. In this method, data obtained by the second node can be effectively used, and a speed of obtaining network status information by each node on the network is improved, a time period for each node on the network to determine to access a channel is shortened, and a communication speed of the network is improved.

Preferably, the second broadcast frame includes a first time point, and the first time point is a moment at which the second node detects that the interfering node successfully sends the packet through the shared channel.

In some embodiments, the first node may determine the second time segment based on a second time point in the second broadcast frame. Specifically, the first node may determine a time interval between the second moment and a moment at which a previous second time segment corresponding to the second moment is 0 as the second time interval. When the first time interval is shorter than the second time interval, the first node determines that the second time segment corresponding to the second moment is 0. It may be understood that, when the second broadcast frame is lost or delayed, the method may be used to resolve a problem that the second time segment is 0 again after the first node receives the second broadcast frame at a moment earlier than a moment at which the second time segment is 0 last time.

It should be noted that the first node may alternatively obtain the second time segment corresponding to any moment in another manner. This is not limited herein.

S102: The first node inputs the network status information at each moment into a target neural network, to obtain a prediction result, where the prediction result includes a first prediction value and a second prediction value.

Specifically, the first node may input the first time segment corresponding to each moment in the target period and the second time segment corresponding to each moment in the target period into the target neural network model, to obtain the first prediction value and the second prediction value. The first prediction value indicates a probability that the first node successfully sends the packet to the second node at the first moment through the shared channel, and the second prediction value indicates a probability that the first node fails to send the packet to the second node at the first moment through the shared channel.

In some embodiments, the target neural network may be obtained through training by using network status information at each moment in a sample period as an input and a result of a packet sent at a sample moment as a label. The sample period is a time segment of preset duration that includes the sample moment and that is before the sample moment. The network status information at each moment in the sample period includes a first time segment corresponding to each moment and a second time segment corresponding to each moment.

It should be noted that the target neural network may be a neural network, such as a deep neural network (Deep Neural Network, DNN), a gate recurrent unit (Gate Recurrent Unit, GRU), or a long short-term memory network (Long Short-Term Memory, LSTM).

FIG. 7 is a schematic diagram of the target neural network according to this embodiment of this application. x indicates a network status at each moment. As shown in FIG. 7, the target period has T moments, and the first node inputs network statuses at the T moments into the target neural network. $x_t$ indicates network status information at the first moment, and an output at the first moment is $y_t$.

The first node may train the target neural network model by using the following loss function:

Loss function:

$$L(\theta) = \frac{1}{N_E} \sum_{e_t \in E} \left[ r_t + \gamma \max_{a'} Q(s_{t+1}, a'; \theta^-) - Q(s_t, a_t; \theta) \right]^2,$$

where $r_t$ indicates a reward value at the first moment, y indicates a discount factor (discount factor), $e_t=(s_t, a_t, r_t, s_{t+1})$ indicates an experience (experience), E indicates an experience pool, NE indicates a quantity of experiences $e_t$ in the experience pool, $Q(s_{t+1}, a'; \theta^-)$ indicates an output of the target neural network, $\theta^-$ is a parameter of the target neural network, $Q(s_t, a_t; \theta)$ indicates an output of the target neural network, and $\theta$ is a parameter of the target neural network.

It may be understood that a training objective is to minimize the loss function, and the parameter of the target neural network may be updated in a training process by using a mini-batch gradient descent (mini-batch gradient descent) method. Each time C times of training are completed, the foregoing parameters are assigned to the target neural network. For example, C may be 100. An optimization parameter h is generated in each training process. As shown in FIG. 7, $h_{t-1}$ is generated in training in which an input is $x_{t-T+1}$, $h_{t-1}$ and $x_{t-T+1}$ are used as inputs for training in next training, to obtain ht.

It should be noted that another loss function may be alternatively used in this embodiment of this application. This is not limited herein.

S103: The first node sends a to-be-sent packet to the second node through the shared channel when the first prediction value is greater than the second prediction value.

Specifically, after obtaining the first prediction value and the second prediction value, the first node may compare the first prediction value with the second prediction value. When the first prediction value is greater than the second prediction value, the first node sends the to-be-sent packet to the second node through the shared channel. When the first prediction value is less than the second prediction value, the first node does not send the to-be-sent packet to the second node through the shared channel.

In some embodiments, the first node may determine, based on function values of a sending state-action value function and a not-sending state-action value function that are obtained in S202, whether to send the to-be-sent packet to the second node. Specifically, if $Q(s_t, 0) > Q(s_t, 1)$, the first node sends the to-be-sent packet to the second node; otherwise, the first node does not send the to-be-sent packet to the second node.

FIG. 8 is a flowchart of another channel access method according to an embodiment of this application. The method is applied to the channel access network in FIG. 2 or FIG. 3, and the method may include some or all of the following steps.

S201: A first node obtains network status information at each moment in a target period, where the target period is a time segment of preset duration that includes a first moment and that is before the first moment, and the network status information includes a busy/idle state of a shared channel detected by the first node, a first time segment, a second time segment, and a number of interfering nodes.

Specifically, the first node may obtain the network status information at each moment in the target period. The target period is the time segment of the preset duration that includes the first moment and that is before the first moment. The network status information includes the busy/idle state of the shared channel detected by the first node, the first time segment, the second time segment, and the number of interfering nodes. A first time segment corresponding to a second moment indicates a time interval between the second moment and a time point at which the first node successfully sends a packet last time through the shared channel before the second moment, and a second time segment corresponding to the second moment indicates a time interval between the second moment and a time point at which an interfering node successfully sends a packet last time through the shared channel before the second moment. The interfering node is a node that is detected by a second node and that sends a packet through the shared channel other than the first node. The second moment is any moment in the target period.

Specifically, step S201 includes some or all of the following steps.

S2011: The first node obtains the busy/idle state of the shared channel at each moment in the target period.

Specifically, the first node may obtain the busy/idle state of the shared channel at each moment in the target period through a carrier sense mechanism. When the first node senses that another node is transmitting a packet through the shared channel, the shared channel at the moment is in the busy state; and when the first node senses that no other node is transmitting a packet through the shared channel, the shared channel at the moment is in the idle state. Further, the first node may record the busy/idle state of the shared channel based on a preset rule.

A method in which the first node obtains the busy/idle state of the shared channel is not limited herein.

S2012: The first node obtains the number of interfering nodes at each moment in the target period.

Specifically, the second node may obtain the number of interfering nodes at each moment, and when obtaining the number of interfering nodes, generate a broadcast frame including the number of the interfering nodes and broadcast the broadcast frame to the first node. Correspondingly, the first node may obtain the number interfering nodes at each moment parsed from the broadcast frame.

For example, at the second moment, the first node receives a first broadcast frame broadcast by the second node, where the first broadcast frame includes a number of interfering nodes; and the first node determines the number of interfering nodes parsed from the first broadcast frame as the number of interfering nodes at the second moment.

Figure 9A:
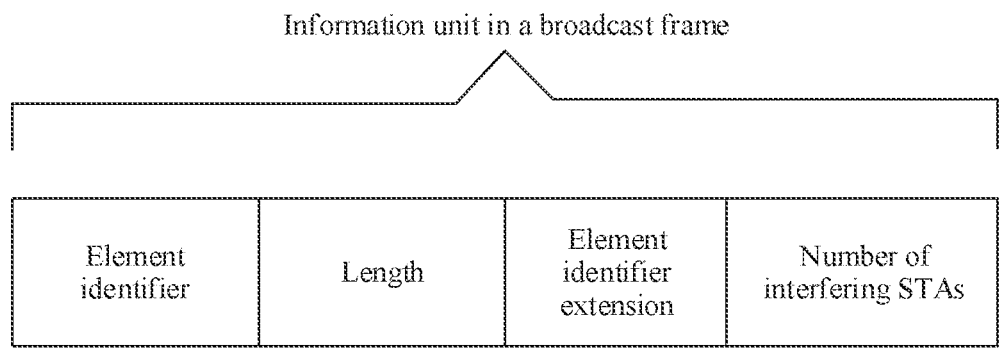
FIG. 9A is a schematic diagram of an information unit of a broadcast frame according to an embodiment of this application.

FIG. 9A is a schematic diagram of an information unit of a broadcast frame according to this embodiment of this application. As shown in FIG. 9A, the information unit may include an element identifier (Element ID), a length (Length), an element identifier extension (Element ID Extension), and the number of interfering STAs (Number of interfering STAs).

In some embodiments, a network architecture may be shown in FIG. 3, where a second node is an AP, and a first node and an interfering node are STAs related to the AP. Specifically, when obtaining the number of interfering nodes, the second node may broadcast the number of interfering nodes to each STA in the same network architecture by using a beacon (beacon). Correspondingly, each STA (including the first node) may receive the broadcast frame, to obtain the number of interfering nodes parsed from the broadcast frame.

In some other embodiments, the second node is a STA, and the second node may broadcast the number of interfering nodes to the first node by using a probe request (probe request) frame.

Figure 9B:
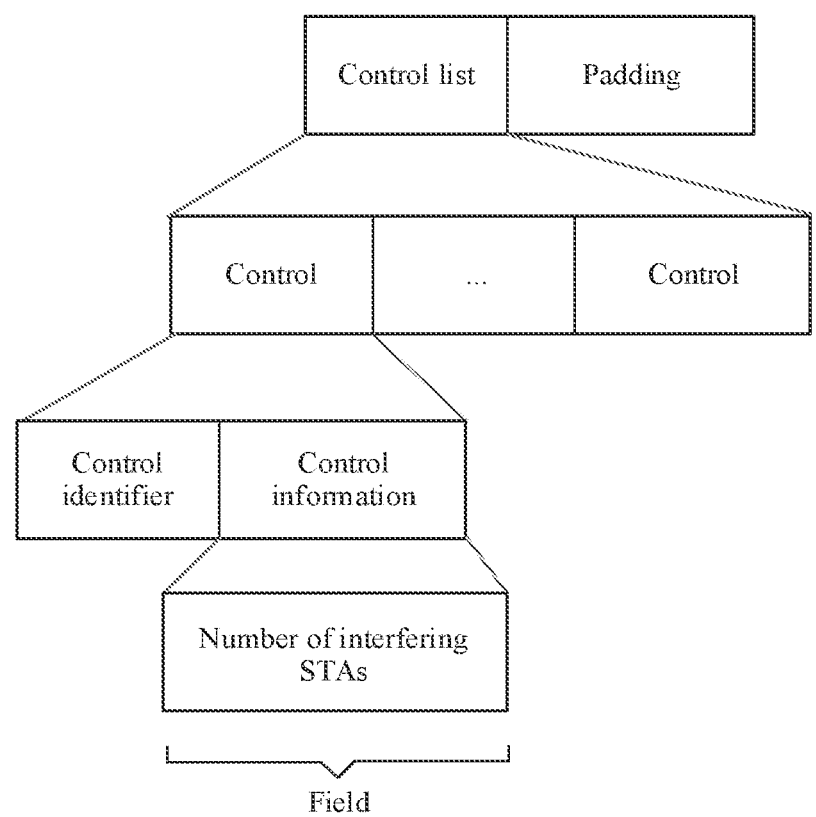
FIG. 9B is a schematic diagram of an information unit of another broadcast frame according to an embodiment of this application.

FIG. 9B is a schematic diagram of an information unit of another broadcast frame according to this embodiment of this application. As shown in FIG. 9B, the number of interfering nodes may exist in a field (A-control subfield) in an HT control field (HT control field). Specifically, in the figure, there is a control list (Control List) and a padding (Padding). One control list includes a plurality of controls (Control), one control may include a control identifier (Control ID) and control information (Control information), and the number of interfering STAs may exist in the control information.

For detailed content in which the first node obtains the first time segment corresponding to each moment and the second time segment corresponding to each moment, refer to related content in step S101. Details are not described herein again.

S202: The first node inputs the network status information at each moment into a target neural network, to obtain a prediction result, where the prediction result includes a first prediction value and a second prediction value.

Specifically, the first node may input the busy/idle state of the shared channel detected by the first node at each moment in the target period, the first time segment, the second time segment, and the number of interfering nodes into the target neural network model, to obtain the first prediction value and the second prediction value. The first prediction value indicates a probability that the first node successfully sends a packet to the second node at the first moment through the shared channel, and the second prediction value indicates a probability that the first node fails to send the packet to the second node at the first moment through the shared channel.

In some embodiments, the target neural network may be obtained through training by using network status information at each moment in a sample period as an input and a result of a packet sent at a sample moment as a label. The sample period is a time segment of preset duration that includes the sample moment and that is before the sample moment. The network status information at each moment in the sample period includes a busy/idle state of a shared channel detected by the first node at each moment, a first time segment, a second time segment, and a number of interfering nodes.

FIG. 7 is a schematic diagram of the target neural network according to this embodiment of this application. x indicates a network status at each moment. As shown in FIG. 7, the target period has T moments, and the first node inputs the network status information at the T moments into the target neural network, to obtain an output $y_t$ at the first moment.

Network status information at the first moment is $x_t=[o_{t-1}, d_{t-1}^0, d_{t-1}^1, N]$, where $o_{t-1}$ indicates a carrier sense result at a previous moment, $d_{t-1}^0$ indicates a first time segment corresponding to the first moment, $d_{t-1}^1$ indicates a second time segment corresponding to the first moment, and N indicates a quantity of interfering nodes at the first moment.

After the first node inputs the network status information at each moment in the target period into the target neural network, to obtain the prediction result, and the output is $y_t=[Q(s_t, 0), Q(s_t, 1)]$, $s_t=(x_{t-T+1}, x_{t-T+2}, \ldots, x_t)$. $Q(s_t,0)$ and $Q(s_t,1)$ separately represent function values of a sending state-action value function (state-action value function) and a non-sending state-action value function (state-action value function), $Q(s_t, 0)$ is a first prediction value at the first moment, and $Q(s_t,1)$ is a second prediction value at the first moment.

S203: The first node sends a to-be-sent packet to the second node through the shared channel when the first prediction value is greater than the second prediction value.

Specifically, after obtaining the first prediction value and the second prediction value, the first node may compare the first prediction value with the second prediction value. When the first prediction value is greater than the second prediction value, the first node sends the to-be-sent packet to the second node through the shared channel. When the first prediction value is less than the second prediction value, the first node does not send the to-be-sent packet to the second node through the shared channel.

In some embodiments, the first node may determine, based on the function values of the sending state-action value function and the not-sending state-action value function that are obtained in S202, whether to send the to-be-sent packet to the second node. Specifically, if $Q(s_t, 0)>Q(s_t, 1)$, the first node sends the to-be-sent packet to the second node; otherwise, the first node does not send the to-be-sent packet to the second node.

In some embodiments, after step S103 and step S203, the channel access method further includes some or all of the following steps:

S301: After sending the to-be-sent packet to the second node through the shared channel, the first node obtains a sending result of the to-be-sent packet.

Specifically, after sending the to-be-sent packet to the second node through the shared channel, the first node may wait for a response, and then determine the sending result of the to-be-sent packet based on the response. For example, when the response carrying indication information indicating a success is received, it is determined that the sending result of the to-be-sent packet indicates a success; or when the response carrying indication information indicating a failure is received, it is determined that the sending result of the to-be-sent packet indicates a failure.

S302: The first node updates the target neural network by using the network status information in the target period as an input and the sending result of the to-be-sent packet as a label.

Specifically, the first node may update the target neural network based on a loss, where the loss includes an error between the prediction result and the sending result of the to-be-sent packet. The first node may obtain the loss based on the sending result of the to-be-sent packet and the prediction result of the target neural network, and then update the target neural network based on the loss.

The loss may further include a reward value at the first moment, and the reward value is determined based on the sending result of the to-be-sent packet and the busy/idle state of the shared channel detected by the first node at the first moment. Specifically, for a computing process for the reward value, refer to the following embodiment of computing the reward value.

The first node may train the target neural network model by using the following loss function:

Loss function:

$$L(\theta) = \frac{1}{N_E}\sum_{e_t \in E}\left[r_t + \gamma\max_{a'}Q(s_{t+1}, a'; \theta^-) - Q(s_t, a_t; \theta)\right]^2,$$

where $r_t$ indicates a reward value at the first moment, y indicates a discount factor (discount factor), $e_t=(s_t, a_t, r_t, s_{t+1})$ indicates an experience (experience), E indicates an experience pool, NE indicates a quantity of experiences $e_t$ in the experience pool, $Q(s_{t+1},a'; \theta^-)$ indicates an output of the target neural network, $\theta^-$ is a parameter of the target neural network, $Q(s_t, at; \theta)$ indicates an output of the target neural network, and $\theta$ is a parameter of the target neural network.

It should be noted that another loss function may be alternatively used in this embodiment of this application. This is not limited herein.

The following describes a reward value computing method provided in embodiments of this application.

In some embodiments, a decision making result is that the first node sends the packet to the second node at the first moment. Further, the first node may determine the reward value at the first moment based on the sending result of the packet.

Specifically, when the sending result of the to-be-sent packet indicates a success, the first node may determine that the reward value is a ratio of the first time segment to the second time segment; or when the sending result of the to-be-sent packet indicates a failure, determine that the reward value is a negative value of the number of interfering nodes at the first moment.

In some other embodiments, a decision making result is that the first node does not send the packet to the second node at the first moment. Therefore, the first node may monitor the busy/idle state of the shared channel at the first moment, and determine the reward value at the first moment.

Specifically, when detecting, at the first moment, that there is the response information indicating that the packet is successfully sent on the shared channel, the first node determines that the reward value is a ratio of a second time segment corresponding to the first moment to a first time segment corresponding to the first moment; or when detecting, at the first moment, that there is the response information indicating that the packet fails to be sent on the shared channel, the first node determines that the reward value is M, where M is a positive integer, for example, N may be 1; or The first node determines, when detecting that there is no response information on the shared channel at the first moment, that the reward value is 0.

To better implement the foregoing solutions in embodiments of this application, correspondingly, the following further provides related apparatuses configured to cooperatively implement the foregoing solutions.

Figure 10:
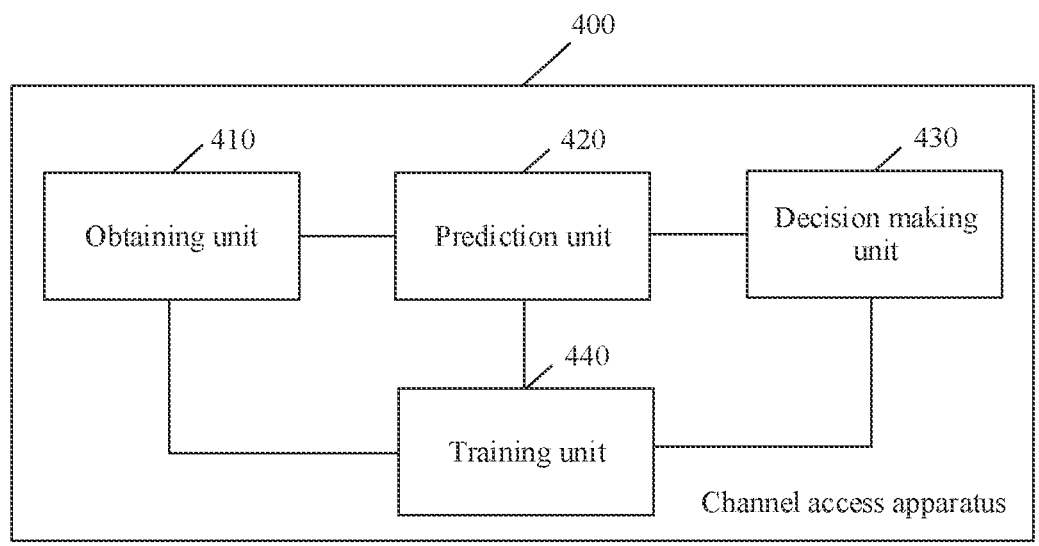
FIG. 10 is a schematic diagram of a structure of a channel access apparatus 400 according to an embodiment of this application.

FIG. 10 is a schematic diagram of a structure of a channel access apparatus 400 according to an embodiment of this application.

An obtaining unit 410 is configured to obtain network status information at each moment in a target period, where the target period is a time segment of preset duration that includes a first moment and that is before the first moment. The network status information includes a first time segment and a second time segment, a first time segment corresponding to a second moment indicates a time interval between the second moment and a time point at which a first node successfully sends a packet last time through a shared channel before the second moment, and a second time segment corresponding to the second moment indicates a time interval between the second moment and a time point at which an interfering node successfully sends a packet last time through the shared channel before the second moment. The interfering node is a node that is detected by a second node and that sends a packet through the shared channel other than the first node. The second moment is any moment in the target period.

A prediction unit 420 is configured to input the network status information at each moment into a target neural network, to obtain a prediction result, where the prediction result includes a first prediction value and a second prediction value, the first prediction value indicates a probability that the first node successfully sends a packet to the second node at the first moment through the shared channel, and the second prediction value indicates a probability that the first node fails to send the packet to the second node at the first moment through the shared channel.

A decision making unit 430 is configured to send a to-be-sent packet to the second node through the shared channel when the first prediction value is greater than the second prediction value.

In an embodiment, the obtaining unit 410 is further configured to obtain a busy/idle state of the shared channel detected by the first node and a number of interfering nodes.

In an embodiment, the obtaining unit 410 is specifically configured to obtain the second time segment corresponding to the second moment.

The first node determines, when detecting response information at the second moment based on first indication information, that the second time segment corresponding to the second moment is 0, where the second moment is a moment after first duration of detecting a first packet by the first node, a header of the first packet includes the first indication information, and the first indication information indicates a node receiving the first packet to send the response information after the first duration.

In an embodiment, the obtaining unit 410 is specifically configured to obtain the second time segment corresponding to the second moment.

The first node determines, when detecting response information including second indication information at the second moment, that the second time segment corresponding to the second moment is 0, where the second indication information indicates that a sending result of a packet corresponding to the response information including the second indication information indicates a success.

Alternatively, the first node determines, when detecting response information including third indication information at the second moment, that the second time segment corresponding to the second moment is a sum of a first time interval and a second time segment corresponding to a moment previous to the second moment in the target period, where the first time interval is a time interval between the previous moment and the second moment, and the third indication information indicates that a sending result of a packet corresponding to the response information including the second indication information indicates a failure.

In an embodiment, the obtaining unit 410 is specifically configured to obtain a number of interfering nodes at the second moment.

The first node receives, at the second moment, a first broadcast frame broadcast by the second node.

The first node determines a number of interfering nodes parsed from the first broadcast frame as the number of interfering nodes at the second moment.

In an embodiment, the obtaining unit 410 is specifically configured to obtain the second time segment corresponding to the second moment.

The first node determines, when receiving a second broadcast frame at the second moment, that the second time segment corresponding to the second moment is 0, where the second broadcast frame is broadcast by the second node to the first node when the second node detects that the interfering node successfully sends the packet through the shared channel.

In an embodiment, the second broadcast frame includes a first time point, and the first time point is a moment at which the second node detects that the interfering node successfully sends the packet through the shared channel.

In an embodiment, the obtaining unit 410 is specifically configured to:
 determine a time interval between the first time point and the second moment as a first time interval;
 determine a time interval between the second moment and a moment at which a previous second time segment corresponding to the second moment is 0 as a second time interval; and
 when the first time interval is shorter than the second time interval, determine that the second time segment corresponding to the second moment is 0.

In an embodiment, the channel access apparatus further includes a training unit 440, and the training unit 440 is configured to:
 obtain a sending result of the to-be-sent packet; and
 update the target neural network by using the network status information at each moment in the target period as an input and the sending result of the to-be-sent packet as a label.

In an embodiment, the channel access apparatus further includes the training unit 440, and the training unit 440 is specifically configured to update the target neural network based on a loss, where the loss includes an error between the prediction result and a sending result of the to-be-sent packet.

In an embodiment, the loss further includes a reward value at the first moment, and the reward value is determined based on the prediction result and a busy/idle state of the shared channel detected by the first node at the first moment.

In an embodiment, the channel access apparatus further includes the training unit 440, and the training unit 440 is further configured to:

when the sending result of the to-be-sent packet indicates a success, determine that the reward value is a ratio of the first time segment to the second time segment; or when the sending result of the to-be-sent packet indicates a failure, determine that the reward value is a negative value of a number of interfering nodes at the first moment.

In an embodiment, the channel access apparatus further includes a training unit 440, and the training unit 440 is further configured to:

monitor the shared channel at the first moment when the first prediction value is less than the second prediction value; and when detecting, at the first moment, that there is response information indicating that a packet is successfully sent on the shared channel, determine that a reward value is a ratio of a second time segment corresponding to the first moment to a first time segment corresponding to the first moment; or when detecting, at the first moment, that there is response information indicating that the packet fails to be sent on the shared channel, determine that the reward value is M, where M is a positive integer; or determine, when detecting that there is no response information on the shared channel at the first moment, that the reward value is 0.

It may be understood that the apparatus 400 may be an apparatus on an access point AP side, or a chip in an access point AP, to support the access point AP in implementing a corresponding function in the method. The apparatus 400 may also be an apparatus on a station STA side, or a chip in a station STA, to support the STA in implementing a corresponding function in the method.

Figure 11:
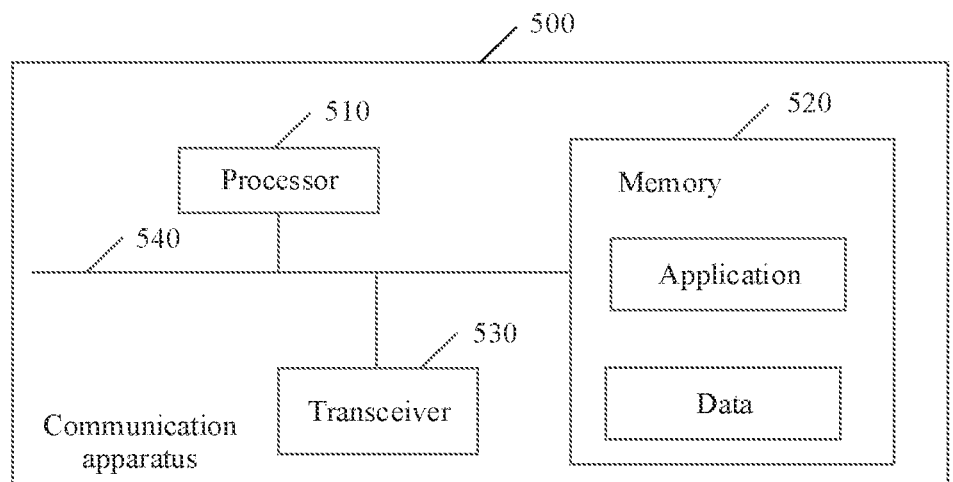
FIG. 11 is a schematic diagram of a structure of another channel access apparatus 500 according to an embodiment of this application.

FIG. 11 shows another channel access apparatus 500 according to an embodiment of this application. The channel access apparatus 500 includes at least a processor 510, a memory 520, and a transceiver 530. The processor 510, the memory 520, and the transceiver 530 are connected to each other through a bus 540.

The memory 520 includes but is not limited to a random access memory (Random Access Memory, RAM), a read-only memory (Read-Only Memory, ROM), or an erasable programmable read-only memory (Erasable Programmable Read-Only Memory, EPROM), or a flash memory. The memory 520 is configured to store related instructions and related data.

The transceiver 530 may include a receiver and a transmitter, for example, a radio frequency module. That the processor 510 receives or sends a message in the following description may be specifically understood as that the processor 510 receives or sends the message by using the transceiver 530.

The processor 510 may be one or more central processing units (Central Processing Units, CPUs). When the processor 510 is one CPU, the CPU may be a single-core CPU, or may be a multi-core CPU.

The processor 510 in the channel access apparatus 500 is configured to read program code stored in the memory 520, to perform the following operations:

A first node obtains network status information at each moment in a target period, where the target period is a time segment of preset duration that includes a first moment and that is before the first moment. The network status information includes a first time segment and a second time segment, a first time segment corresponding to a second moment indicates a time interval between the second moment and a time point at which the first node successfully sends a packet last time through a shared channel before the second moment, and a second time segment corresponding to the second moment indicates a time interval between the second moment and a time point at which an interfering node successfully sends a packet last time through the shared channel before the second moment. The interfering node is a node that is detected by a second node and that sends a packet through the shared channel other than the first node. The second moment is any moment in the target period.

The first node inputs the network status information at each moment into a target neural network, to obtain a prediction result, where the prediction result includes a first prediction value and a second prediction value, the first prediction value indicates a probability that the first node successfully sends a packet to the second node at the first moment through the shared channel, and the second prediction value indicates a probability that the first node fails to send the packet to the second node at the first moment through the shared channel.

The first node sends a to-be-sent packet to the second node through the shared channel when the first prediction value is greater than the second prediction value.

In a possible implementation, the network status information further includes a busy/idle state of the shared channel detected by the first node and a number of interfering nodes.

In a possible implementation, that a first node obtains network status information at each moment in a target period includes: obtaining the second time segment corresponding to the second moment; and the obtaining the second time segment corresponding to the second moment includes:

The first node determines, when detecting response information at the second moment based on first indication information, that the second time segment corresponding to the second moment is 0, where the second moment is a moment after first duration of detecting a first packet by the first node, a header of the first packet includes the first indication information, and the first indication information indicates a node receiving the first packet to send the response information after the first duration.

In a possible implementation, that a first node obtains network status information at each moment in a target period includes: obtaining the second time segment corresponding to the second moment; and the obtaining the second time segment corresponding to the second moment includes:

The first node determines, when detecting response information including second indication information at the second moment, that the second time segment corresponding to the second moment is 0, where the second indication information indicates that a sending result of a packet corresponding to the response information including the second indication information indicates a success; or the first node determines, when detecting response information including third indication information at the second moment, that the second time segment corresponding to the second moment is a sum of a first time interval and a second time segment corresponding to a moment previous to the second moment in the target period, where the first time interval is a time interval between the previous moment and the second moment, and the third indication information indicates that a sending result of a packet corresponding to the response information including the second indication information indicates a failure.

In a possible implementation, that a first node obtains network status information at each moment in a target period includes: obtaining a number of interfering nodes at the second moment; and the obtaining a number of interfering nodes at the second moment includes:

The first node receives, at the second moment, a first broadcast frame broadcast by the second node; and the first node determines a number of interfering nodes parsed from the first broadcast frame as the number of interfering nodes at the second moment.

In a possible implementation, that a first node obtains network status information at each moment in a target period includes: obtaining the second time segment corresponding to the second moment; and the obtaining the second time segment corresponding to the second moment includes:

The first node determines, when receiving a second broadcast frame at the second moment, that the second time segment corresponding to the second moment is 0, where the second broadcast frame is broadcast by the second node to the first node when the second node detects that the interfering node successfully sends the packet through the shared channel.

In a possible implementation, the second broadcast frame includes a first time point, and the first time point is a moment at which the second node detects that the interfering node successfully sends the packet through the shared channel.

In a possible implementation, that the first node determines, when receiving a second broadcast frame at the second moment, that the second time segment corresponding to the second moment is 0 includes:

The first node determines a time interval between the first time point and the second moment as a first time interval;

a time interval between the second moment and a moment at which a previous second time segment corresponding to the second moment is 0 is determined as a second time interval; and when the first time interval is shorter than the second time interval, that the second time segment corresponding to the second moment is 0 is determined.

In a possible implementation, after the first node sends a to-be-sent packet to the second node through the shared channel, the method further includes:

The first node obtains a sending result of the to-be-sent packet; and the first node updates the target neural network by using the network status information at each moment in the target period as an input and the sending result of the to-be-sent packet as a label.

In a possible implementation, that the first node updates the target neural network by using the network status information in the target period as an input and the sending result of the to-be-sent packet as a label includes:

updating the target neural network based on a loss, where the loss includes an error between the prediction result and the sending result of the to-be-sent packet.

In a possible implementation, the loss further includes a reward value at the first moment, and the reward value is determined based on the prediction result and a busy/idle state of the shared channel detected by the first node at the first moment.

In a possible implementation, when the sending result of the to-be-sent packet indicates a success, that the reward value is a ratio of the first time segment to the second time segment is determined; or when the sending result of the to-be-sent packet indicates a failure, that the reward value is a negative value of a number of interfering nodes at the first moment is determined.

In a possible implementation, the first node monitors the shared channel at the first moment when the first prediction value is less than the second prediction value; and when detecting, at the first moment, that there is response information indicating that a packet is successfully sent on the shared channel, the first node determines that a reward value is a ratio of a second time segment corresponding to the first moment to a first time segment corresponding to the first moment; or when detecting, at the first moment, that there is response information indicating that the packet fails to be sent on the shared channel, the first node determines that the reward value is M, where M is a positive integer; or the first node determines, when detecting that there is no response information on the shared channel at the first moment, that the reward value is 0.

It may be understood that the apparatus 500 may be an apparatus on an access point AP side, or a chip in an access point AP; or the apparatus 500 may be an apparatus on a station STA side, or a chip in a station STA.

An embodiment of this application further provides a computer-readable storage medium. The computer-readable storage medium stores instructions. When the instructions are run on a computer or a processor, the computer or the processor is enabled to perform one or more steps in the channel access method for any physical layer protocol data unit. When the modules in the foregoing apparatuses are implemented in a form of a software functional unit and sold or used as an independent product, the modules may be stored in the computer-readable storage medium.

The computer-readable storage medium may be an internal storage unit of the channel access apparatus described in any one of the foregoing embodiments, for example, a hard disk or memory of the channel access apparatus. The computer-readable storage medium may alternatively be an external storage device of the channel access apparatus, for example, a plug-in hard disk, a smart media card (Smart Media Card, SMC), a secure digital (Secure Digital, SD) card, or a flash card (Flash Card) that are disposed on the channel access apparatus. Further, the computer-readable storage medium may include both the internal storage unit and the external storage device of the channel access apparatus. The computer-readable storage medium is configured to store the computer program and other programs and data required by the channel access apparatus. The computer-readable storage medium may be configured to temporarily store data that has been output or is to be output.

Persons of ordinary skill in the art may understand that all or some of the processes of the methods in embodiments may be implemented by a computer program instructing relevant hardware. The program may be stored in a computer-readable storage medium. When the program runs, the processes of the methods in embodiments are performed. The foregoing storage medium includes any medium that can store program code, such as a ROM, a RAM, a magnetic disk, or an optical disc.

A sequence of the steps of the method in embodiments of this application may be adjusted, combined, or deleted based on an actual requirement.

The modules in the apparatus in embodiments of this application may be combined, divided, and deleted based on an actual requirement.

In conclusion, the foregoing embodiments are merely intended for describing the technical solutions of this application, but not for limiting this application. Although this application is described in detail with reference to the foregoing embodiments, persons of ordinary skill in the art should understand that they may still make modifications to the technical solutions described in the foregoing embodiments or make equivalent replacements to some technical features thereof, without departing from the scope of the technical solutions of embodiments of this application.

What is claimed is:

1. A method, wherein the method comprises:
obtaining, by a first node, network status information in a target period, wherein the target period is a time segment of preset duration that comprises a first moment and that is before the first moment; the network status information comprises a first time segment and a second time segment both corresponding to a second moment; the first time segment indicates a first time interval between the second moment and a time point at which the first node successfully sends a packet last time through a shared channel before the second moment; the second time segment indicates a second time interval between the second moment and a time point at which an interfering node successfully sends a packet last time through the shared channel before the second moment; the interfering node is a node that is detected by a second node and that sends a packet through the shared channel other than the first node; and the second moment is in the target period;
inputting, by the first node, the network status information into a target neural network, to obtain a prediction result, wherein the prediction result comprises a first prediction value and a second prediction value; the first prediction value indicates a probability that the first node successfully sends a packet to the second node at the first moment through the shared channel; and the second prediction value indicates a probability that the first node fails to send the packet to the second node at the first moment through the shared channel; and
sending, by the first node, a to-be-sent packet to the second node through the shared channel in response to determining that the first prediction value is greater than the second prediction value.

2. The method according to claim 1, wherein the network status information further comprises a busy/idle state of the shared channel detected by the first node and a number of interfering nodes.

3. The method according to claim 1, wherein the obtaining, by a first node, network status information in a target period comprises: obtaining the second time segment corresponding to the second moment; and
the obtaining the second time segment corresponding to the second moment comprises:
determining, by the first node in response to detecting response information at the second moment based on first indication information, that the second time segment corresponding to the second moment is 0, wherein the second moment is a moment after first duration of detecting a first packet by the first node, a header of the first packet comprises the first indication information, and the first indication information indicates a node receiving the first packet to send the response information after the first duration.

4. The method according to claim 1, wherein the obtaining, by a first node, network status information in a target period comprises: obtaining the second time segment corresponding to the second moment; and
the obtaining the second time segment corresponding to the second moment comprises:
determining, by the first node in response to detecting response information comprising second indication information at the second moment, that the second time segment corresponding to the second moment is 0, wherein the second indication information indicates that a sending result of a packet corresponding to the response information comprising the second indication information indicates a success; or
determining, by the first node in response to detecting response information comprising third indication information at the second moment, that the second time segment corresponding to the second moment is a sum of a third time interval and a second time segment corresponding to a moment previous to the second moment in the target period, wherein the third time interval is a time interval between the previous moment and the second moment, and the third indication information indicates that a sending result of a packet corresponding to the response information comprising the third indication information indicates a failure.

5. The method according to claim 1, wherein the obtaining, by a first node, network status information in a target period comprises: obtaining a number of interfering nodes at the second moment; and
the obtaining a number of interfering nodes at the second moment comprises:
receiving, by the first node at the second moment, a first broadcast frame broadcasted by the second node; and
determining, by the first node, a number of interfering nodes parsed from the first broadcast frame as the number of interfering nodes at the second moment.

6. The method according to claim 1, wherein the obtaining, by a first node, network status information in a target period comprises: obtaining the second time segment corresponding to the second moment; and
the obtaining the second time segment corresponding to the second moment comprises:
determining, by the first node in response to receiving a second broadcast frame at the second moment, that the second time segment corresponding to the second moment is 0, wherein the second broadcast frame is broadcasted by the second node to the first node in response to the second node detecting that the interfering node successfully sends the packet through the shared channel.

7. The method according to claim 6, wherein the second broadcast frame comprises a first time point, and the first time point is a moment at which the second node detects that the interfering node successfully sends the packet through the shared channel.

8. The method according to claim 7, wherein the determining, by the first node in response to receiving a second broadcast frame at the second moment, that the second time segment corresponding to the second moment is 0 comprises:
determining, by the first node, a time interval between the first time point and the second moment as a fourth time interval;

determining a time interval between the second moment and a moment at which a previous second time segment corresponding to the second moment is 0 as a fifth time interval; and in response to determining that the fourth time interval is shorter than the fifth time interval, determining that the second time segment corresponding to the second moment is 0.

9. The method according to claim 1, wherein after the sending, by the first node, a to-be-sent packet to the second node through the shared channel, the method further comprises:

obtaining, by the first node, a sending result of the to-be-sent packet; and updating, by the first node, the target neural network by using the network status information in the target period as an input and the sending result of the to-be-sent packet as a label.

10. The method according to claim 9, wherein the updating, by the first node, the target neural network by using the network status information in the target period as an input and the sending result of the to-be-sent packet as a label comprises:

updating the target neural network based on a loss, wherein the loss comprises an error between the prediction result and the sending result of the to-be-sent packet.

11. The method according to claim 10, wherein the loss further comprises a reward value at the first moment, and the reward value is determined based on the prediction result and a busy/idle state of the shared channel detected by the first node at the first moment.

12. The method according to claim 11, wherein the method further comprises:

in response to determining that the sending result of the to-be-sent packet indicates a success, determining that the reward value is a ratio of the first time segment to the second time segment; or in response to determining that the sending result of the to-be-sent packet indicates a failure, determining that the reward value is a negative value of a number of interfering nodes at the first moment.

13. The method according to claim 1, wherein the method further comprises:

monitoring, by the first node, the shared channel at the first moment in response to determining that the first prediction value is less than the second prediction value; and in response to detecting, at the first moment, that there is response information indicating that a packet is successfully sent on the shared channel, determining, by the first node, that a reward value is a ratio of the second time segment to the first time segment; or in response to detecting, at the first moment, that there is response information indicating that the packet fails to be sent on the shared channel, determining, by the first node, that the reward value is M, wherein M is a positive integer; or determining, by the first node in response to detecting that there is no response information on the shared channel at the first moment, that the reward value is 0.

14. A channel access apparatus, applied to a first node, comprising at least one processor, at least one memory coupled to the at least one processor, an input interface, and an output interface, wherein the at least one memory stores programming instructions for execution by the at least one processor to cause the channel access apparatus to perform operations comprising:

obtaining network status information in a target period, wherein the target period is a time segment of preset duration that comprises a first moment and that is before the first moment; the network status information comprises a first time segment and a second time segment both corresponding to a second moment; the first time segment indicates a first time interval between the second moment and a time point at which the first node successfully sends a packet last time through a shared channel before the second moment; the second time segment indicates a second time interval between the second moment and a time point at which an interfering node successfully sends a packet last time through the shared channel before the second moment; the interfering node is a node that is detected by a second node and that sends a packet through the shared channel other than the first node; and the second moment is in the target period;

inputting the network status information into a target neural network, to obtain a prediction result, wherein the prediction result comprises a first prediction value and a second prediction value; the first prediction value indicates a probability that the first node successfully sends a packet to the second node at the first moment through the shared channel; and the second prediction value indicates a probability that the first node fails to send the packet to the second node at the first moment through the shared channel; and sending a to-be-sent packet to the second node through the shared channel in response to determining that the first prediction value is greater than the second prediction value.

15. The channel access apparatus according to claim 14, wherein the network status information further comprises a busy/idle state of the shared channel detected and a number of interfering nodes.

16. The channel access apparatus according to claim 14, wherein the obtaining network status information in a target period comprises: obtaining the second time segment corresponding to the second moment; and the obtaining the second time segment corresponding to the second moment comprises:

determining, in response to detecting response information at the second moment based on first indication information, that the second time segment corresponding to the second moment is 0, wherein the second moment is a moment after first duration of detecting a first packet, a header of the first packet comprises the first indication information, and the first indication information indicates a node receiving the first packet to send the response information after the first duration.

17. The channel access apparatus according to claim 14, wherein the obtaining network status information in a target period comprises: obtaining the second time segment corresponding to the second moment; and the obtaining the second time segment corresponding to the second moment comprises:

determining, in response to detecting response information comprising second indication information at the second moment, that the second time segment corresponding to the second moment is 0, wherein the second indication information indicates that a sending result of a packet corresponding to the response information comprising the second indication information indicates a success; or determining, in response to detecting response information comprising third indication information at the second moment, that the second time segment corresponding to the second moment is a sum of a third time interval and a second time segment corresponding to a moment previous to the second moment in the target period, wherein the third time interval is a time interval between the previous moment and the second moment, and the third indication information indicates that a sending result of a packet corresponding to the response information comprising the third indication information indicates a failure.

18. The channel access apparatus according to claim 14, wherein the obtaining network status information in a target period comprises: obtaining a number of interfering nodes at the second moment; and the obtaining a number of interfering nodes at the second moment comprises:

receiving, at the second moment, a first broadcast frame broadcasted by the second node; and determining a number of interfering nodes parsed from the first broadcast frame as the number of interfering nodes at the second moment.

19. The channel access apparatus according to claim 14, wherein the obtaining network status information in a target period comprises: obtaining the second time segment corresponding to the second moment; and the obtaining the second time segment corresponding to the second moment comprises:

determining, in response to receiving a second broadcast frame at the second moment, that the second time segment corresponding to the second moment is 0, wherein the second broadcast frame is broadcasted by the second node to the first node in response to the second node detecting that the interfering node successfully sends the packet through the shared channel.

20. A non-transitory computer-readable storage medium, wherein the non-transitory computer-readable storage medium stores programming instructions for execution by at least one processor of an apparatus to cause the apparatus to perform operations comprising:

obtaining network status information in a target period, wherein the target period is a time segment of preset duration that comprises a first moment and that is before the first moment; the network status information comprises a first time segment and a second time segment both corresponding to a second moment; the first time segment indicates a first time interval between the second moment and a time point at which a first node successfully sends a packet last time through a shared channel before the second moment; the second time segment indicates a second time interval between the second moment and a time point at which an interfering node successfully sends a packet last time through the shared channel before the second moment; the interfering node is a node that is detected by a second node and that sends a packet through the shared channel other than the first node; and the second moment is in the target period;

inputting the network status information into a target neural network, to obtain a prediction result, wherein the prediction result comprises a first prediction value and a second prediction value; the first prediction value indicates a probability that the first node successfully sends a packet to the second node at the first moment through the shared channel; and the second prediction value indicates a probability that the first node fails to send the packet to the second node at the first moment through the shared channel; and sending a to-be-sent packet to the second node through the shared channel in response to determining that the first prediction value is greater than the second prediction value.

* * * * *